July 14, 1931.  J. L. BECKER  1,814,426
CONTROLLING DEVICE FOR MOTOR VEHICLES
Filed April 12, 1928  3 Sheets-Sheet 1

INVENTOR
JOSEPH L. BECKER
BY
ATTORNEY

July 14, 1931.  J. L. BECKER  1,814,426
CONTROLLING DEVICE FOR MOTOR VEHICLES
Filed April 12, 1928  3 Sheets-Sheet 2

INVENTOR
JOSEPH L. BECKER
BY
ATTORNEY

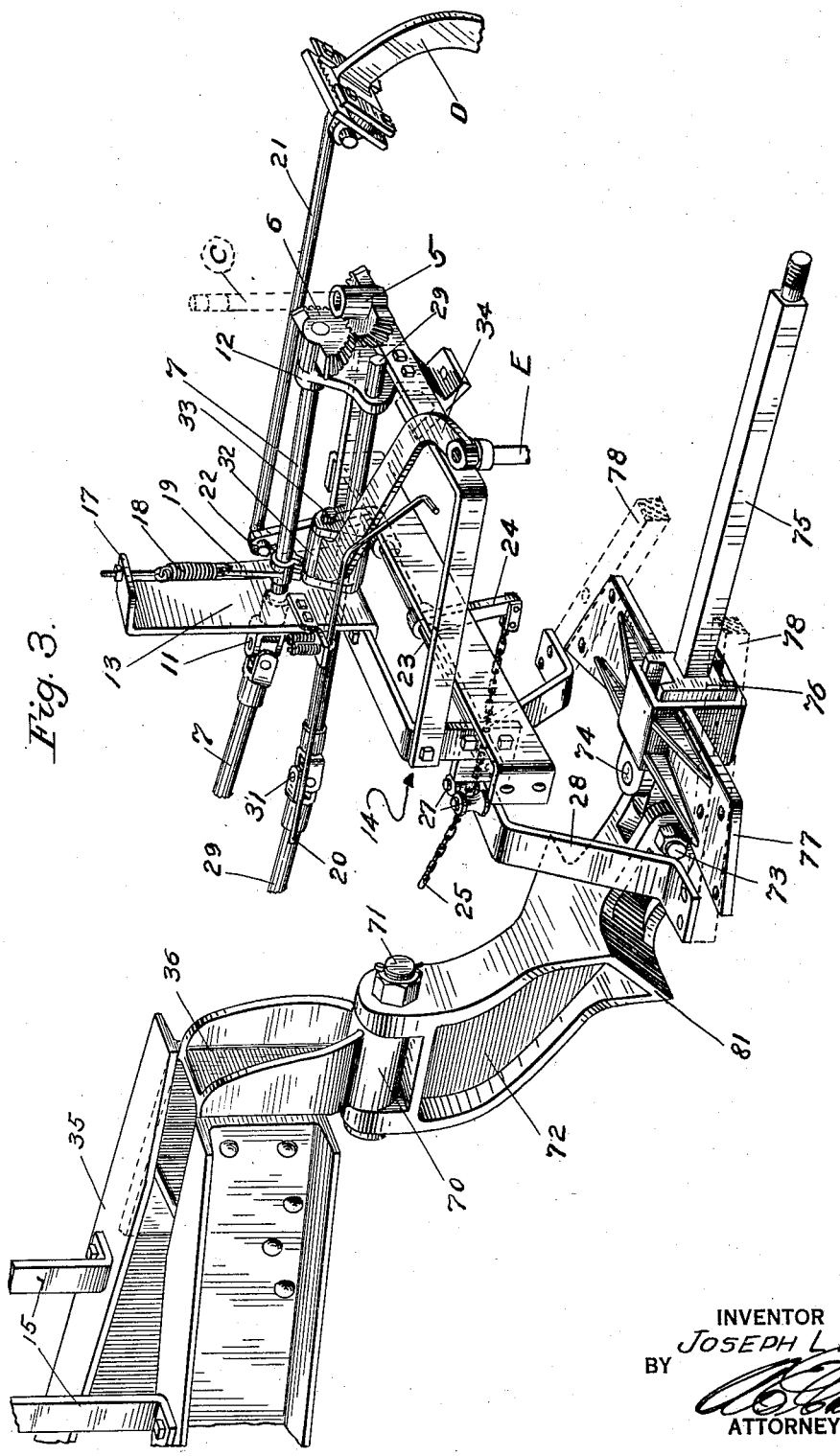

Patented July 14, 1931

1,814,426

UNITED STATES PATENT OFFICE

JOSEPH L. BECKER, OF MINNEAPOLIS, MINNESOTA

CONTROLLING DEVICE FOR MOTOR VEHICLES

Application filed April 12, 1928. Serial No. 269,458.

This invention relates to power operated road maintaining equipment, and the primary object is to provide a novel, efficient and highly improved construction of a combination tractor-grader, in which the tractor is of the stable type, and in which the grader unit is drawn behind the tractor, said grader unit being supported, at its rear end upon suitable ground wheels, while its forward end is detachably secured to and carried by the tractor. A further object is to provide a machine of the character above set forth, in which both the tractor and the grader are controlled by an operator who is stationed on the grader unit. A further object is to provide an improved coupler mechanism for connecting the tractor unit with the grader unit, whereby the latter will properly trail behind the former and whereby shocks, vibrations and jars to which one of the units may be subjected, will be cushioned as respect to the other unit. Still other and more specific objects will be disclosed in the course of the following specification, reference being had to the accompanying drawings, in which:

Fig. 3 is an enlarged perspective detail elevation of the tractor-grader coupler connection and certain controls and control supports.

Figure 1:
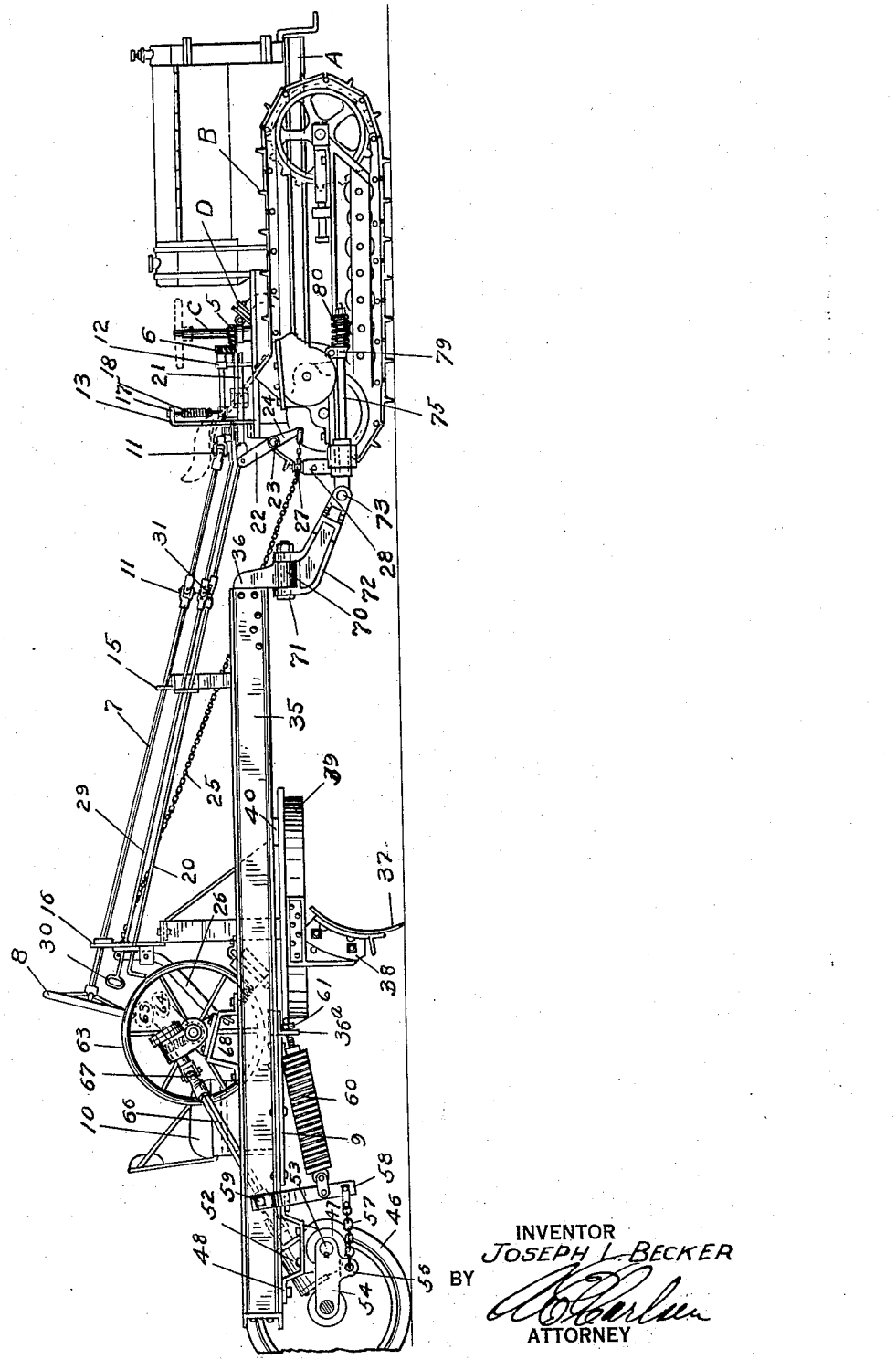
Fig. 1 is a side elevation of the entire machine, as seen from the right, and with the near supporting wheel at the rear end of the grader removed for purpose of illustration.
Figure 2:
Fig. 2 is a plan view of the machine, with fractional portions broken away or removed.

Referring to the drawings more particularly and by reference characters, A designates the main frame of a common type of tractor, having crawler or caterpillar tracks B which entirely support the tractor in a stable manner, and which steer the tractor under the engine power through the usual planetary compensating gears (not shown), under selectively applied brake action controlled by a steering column C. As the machine is to be operated entirely from the grader unit the usual handwheel of the steering column C may be removed, and the column or steering post is then provided with a bevel gear segment 5 that meshes with and is oscillated by a similar segment 6 at the forward end of a shaft 7, the rear end of which has a hand wheel 8, within rear of an operator who may either stand on a platform 9 or sit in a seat 10. As the forward and rearward parts of the control shaft 7 are not in alignment, and as the grader trails or angles laterally behind the tractor the shaft is sectionally formed, being provided with universal joints 11. The foremost section of the shaft 7 is journaled in bearings 12 and 13 of a frame unit 14, secured to the tractor, and the rearmost section is suitably journalled, as in bearing brackets 15 and 16 of the grader unit. As shown in Fig. 3, the bearing bracket 13 is provided with an end flange extension 17 to which is adjustably secured a spring 18. The lower end of this spring is secured to an arm 19 rigidly secured to the shaft 7 and tends to hold it in a vertical position, with a result that when a turn has been made, the spring 18 will automatically restore the steering mechanism to its initial position and the tractor will again assume its normal forward direction.

The speed of the machine is controlled by a fuel control rod 20.

The usual clutch pedal D of the tractor is operated, as follows: This pedal is connected by a link bar 21 to a crank arm 22 of a cross shaft 23 journaled in the frame 14. The shaft 23 is provided with a second, depending arm 24, to which is attached the forward end of a chain 25, the rear end of which is attached to a foot lever 26 on the grader unit, with a result that when the operator actuates the lever 26 he will release the tractor clutch. The chain 25 guides between the two rollers 27 carried on a bracket member 28, on the tractor.

The gear shift lever E of the tractor is shifted transversely and longitudinally of the tractor, so as to bring the transmission mechanism into neutral, reverse, and the various forward speed positions, by a control rod 29 that extends rearwardly where it terminates in a handle 30. This rod 29, like the rod 7, is sectionally formed, having universal joints 31, and is mounted for both sliding and rotating movement in the bearing brackets 12, 13, 15 and 16. Rigidly secured upon the forward section of the shaft or rod 29, between the bearing members 12 and 13, is a casting 32, to which is secured, by a longitudinally extending pivot pin 33, the rear end of a control arm 34, the forward end of which is secured to the gear shift lever E. It will now be seen that transverse shifting of the lever E may be effected by turning the handle 30, as this action will throw the pin 33 and arm 34 from one side to the other, and when the shift lever is thus moved to the lateral or transverse position desired, it may then be moved forwardly or rearwardly by merely pushing or pulling on the handle 30.

The tractor controls having been described, attention will now be directed to the grader construction and its particular functions and advantages.

The grader unit proper has a substantially rectangular channel iron main frame 35, the side bars of which, however, converge forwardly where they are secured to and joined by a casting 36. At an intermediate point the side bars are connected by a cross beam 36ª, that projects laterally beyond the frame, and are also connected by the platform 9, upon which is secured the operator's seat or station 10, or upon which the operator may stand if he so desires. All of the tractor and grader controls are within convenient reach of the operator when he is so stationed.

The grader blade 37 is adjustably secured, by brackets 38 to a T-steel circle 39, which in turn is secured by suitable brackets 40 to the frame 32, so that it may be turned, upon a vertical center, to adjust the working angle of the blade with respect to the longitudinal axis of the machine. The circle is releasably secured in various adjusted positions by a handle 44, which operates in a manner more fully illustrated and described in my copending application for Patent Ser. No. 268,547, filed April 9, 1928, for combination tractor grader.

It will be noted that the blade 37 is not tiltably adjustable in a transverse direction, with respect to the frame 35, but is rigidly connected therewith, with a result that there is no slack or play in the blade, with respect to the main frame, as occurs in machines where the blade is suspended by links, levers, etc., and consequently the entire weight of the grader frame unit is utilized to rigidly hold and sustain the blade against jars and vibrations such as occur when it strikes hard and uneven spots in the road surface. It will thus be seen that the blade will always travel and operate at a predetermined uniform angle, and will not be upset or materially influenced by unusual road conditions, due to the fact that the entire weight of the machine is applied to it when the resistance is variable or great.

It is obviously necessary, however, to provide means for adjusting the transverse angle or inclination of the blade, and this I do, not by adjusting the blade with respect to the frame, but by adjusting the frame proper with respect to the axes of the wheels 45 and 46, which support the rear end of the frame. It may here be noted that the rear wheels 45 and 46 are laterally spaced, and that they travel on the road surface that has been traversed, by the grader blade 37, with a result that the angle or transverse inclination of the blade, as set by the operator, will always be parallel with and be held at a uniform position with respect to the graded and not the ungraded surface of the road.

The device I employ for transversely adjusting the main frame 35 with respect to the rear supporting wheels 45 and 46 is fully disclosed and described in my above mentioned copending application, Ser. No. 268,547. In order that its construction and operation may be properly considered in connection with other parts of the machine, however, it may be briefly described as follows:

An axle housing 47 extends transversely across the frame 32, and is rigidly secured thereto, as by brackets 48. The housing 47 is provided with two spaced enlargements 49 in which operate a pair of worm gears (not shown), respectively mounted on shaft sections 53 that are journaled in the housing 47 and extend thereinto from the ends thereof. At their outer ends the shaft sections 53 are provided with crank arms 54, the rear ends of which have stub axles 55 for supporting engagement in the hubs of the wheels 45 and 46. The cranks 54 have depending extensions 56, connected by short chain sections 57 to a pair of levers 58, the upper ends of which fulcrum at 59, to the frame 35. The levers 58 are yieldingly pulled downward and forward under the contracting action of a pair of powerful compensating springs 60, the front ends of which are adjustably secured, as at 61, to the projecting ends of the cross beam 36ª. It will thus be seen that the wheels 45 and 46 support the entire rear part of the grader mechanism, but that under the action of the compensating springs 60 it requires but comparatively little power to raise and lower either or both sides of the grader frame, yet, the springs 60 will not permit a yielding or spring action to the frame 35, because of the locking effect of the worms and worm gears within the housings 49 and 52. The control worms (not shown) in the housing extensions 52 are manually operated by laterally disposed hand wheels 62 and 63, through the medium of suitably encased intermeshing pinions 64, 65, and shafts 66, having universal joints 67. The hand wheels 62 and 63 are carried by suitable bearing brackets 68 of the main frame 35.

Attention is now directed to the tractor grader trailing connection and the yieldable or cushioned draw bar construction, as shown particularly in Figs. 1 and 3.

The grader unit casting 36 has a longitudinally extending bearing portion 70, which receives the pivot pin 71 of a forwardly inclined casting 72. The forward end of the casting 72 is universally connected, as by a transverse pivot 73 and a vertical pivot 74, to the rear end of a draw bar 75. Said draw bar is provided near its rear end, with a guide block 76 that slidably guides in a cross beam 77. The members 77 and 28 are rigidly secured to the tractor by being clamped by bolts, one under and one over rearwardly projecting frame portions of the tractor, indicated at 78 in Fig. 3 by dotted lines. The forward portion of the draw bar 75 guides in a bracket 79 (Fig. 1), between which and a nut at the front end of the bar is secured a spring 80. It will thus be seen that the spring 80 will tend to cushion all jars as between the tractor and grader units proper.

It may here be noted that the coupler casting 72 is provided with a pair of laterally disposed, integral shoulders 81. These shoulders are so arranged that they will abut against the members 28—78—77 when too sharp a turn is attempted, in which event other and less sturdy parts of the grader and tractor units will be prevented from contacting.

It will be understood from the foregoing description that an operator stationed upon the seat 10 or platform 9 of the grader will not only have full control of all the tractor and grader mechanisms set forth, but will also have all the important parts of the machine and the roadway under full visual observation, whereby to better enable him to manipulate the various controls to guide and adjust the machine. It will also be understood that in a tractor-grader combination as herein arranged the outstanding advantage, as compared to the now commonly known push type graders, lies in the fact that the grader unit part of the machine is pulled behind the traction part, with a result that the grader will not have a tendency to steer or guide the tractor off of the road regardless of the amount of work it does or resistance it meets with. It is further understood that the disclosure hereinabove described is merely illustrative of a preferred embodiment of my invention, and that various modifications thereof are permissible without departing from the spirit and scope of the appended claims. Having therefore now fully illustrated and set forth the invention in detail, what I claim is:

1. A device for steering a tractor from a vehicle connected to and drawn thereby, comprising a frame carried by the rear end of the tractor, a shaft journaled in the frame and having an extension reaching to the vehicle, means for connecting the shaft to the normal steering post of the tractor, a crank arm carried by the shaft and a spring attached to the crank arm for yieldingly retaining it in its normal position of rest.

2. A device for actuating the clutch pedal of a tractor from a vehicle connected thereto and drawn thereby, comprising a frame at the rear of the tractor, a transverse shaft journaled in the frame, an arm extending from the shaft, a link connecting the arm with the clutch pedal, and means extending to the vehicle for oscillating the shaft.

3. A device for actuating the clutch pedal of a tractor from a vehicle connected thereto and drawn thereby, comprising a frame at the rear of the tractor, a transverse shaft journaled in the frame, an arm extending from the shaft, a link connecting the arm with the clutch pedal, and means extending to the vehicle for oscillating the shaft, said means including a flexible pull member.

4. A device for actuating the clutch pedal of a tractor from a vehicle connected thereto and drawn thereby, comprising a frame at the rear of the tractor, a transverse shaft journaled in the frame, an arm extending from the shaft, a link connecting the arm with the clutch pedal, and means extending to the vehicle for oscillating the shaft, said means including a flexible pull member and guides therefor.

5. A device for actuating the clutch pedal of a tractor from a vehicle connected thereto and drawn thereby, comprising a frame at the rear of the tractor, a transverse shaft journaled in the frame, an arm extending from the shaft, a link connecting the arm with the clutch pedal, and means extending to the vehicle for oscillating the shaft, said means including a flexible pull member and a lever member carried on the vehicle for actuating the pull member.

6. A device for actuating the clutch pedal of a tractor from a vehicle connected thereto by a vertical pivot, comprising a lever acting member having two arms extending in opposite directions from a fulcrum center supported on the tractor, a connection between one of the arms and the clutch pedal, a flexible pull member extending from the other of said arms to an operator's station on the vehicle, and a pair of closely associated rollers, disposed vertically above said pivot connection to serve as lateral guides for the flexible pull member.

In testimony whereof I affix my signature.

JOSEPH L. BECKER.